(12) United States Patent
You et al.

(10) Patent No.: US 7,542,861 B1
(45) Date of Patent: Jun. 2, 2009

(54) METHOD AND SYSTEM FOR LED CALIBRATION

(75) Inventors: Ju-Yuan You, Hsinchu (TW);
Chien-Feng Chang, Hsinchu (TW);
Wei-Chih Liao, Hsinchu (TW);
Zong-Huai Lee, Hsinchu (TW)

(73) Assignee: Opto Tech Corp., Hsinchu (TW)

( * ) Notice: Subject to any disclaimer, the term of this patent is extended or adjusted under 35 U.S.C. 154(b) by 0 days.

(21) Appl. No.: 12/243,958

(22) Filed: Oct. 1, 2008

(51) Int. Cl.
*G01D 18/00* (2006.01)

(52) U.S. Cl. .................................... 702/85

(58) Field of Classification Search ............... 702/85, 702/90, 104, 105; 382/312, 317, 321; 345/39, 345/40, 44, 45, 77, 82, 84, 589, 597
See application file for complete search history.

(56) References Cited

U.S. PATENT DOCUMENTS 5,796,376 A * 8/1998 Banks .................... 345/82
7,253,566 B2 * 8/2007 Lys et al. ................ 315/291

* cited by examiner

*Primary Examiner*—Drew A Dunn
*Assistant Examiner*—Stephen J Cherry

(57) ABSTRACT

A method and system for LED calibration is provided for a plurality of LED modules cascaded in a series. Each LED module includes a plurality of LEDs, a driver and a controller. The control signal from a calibration host is transmitted to all the modules to light all LEDs in the LED module. Through the controller of the LED module, the calibration data transmitted from the calibration host is stored in the memory inside the driver so that all the LEDs will emit light according to the calibration. The present invention improves the uniformity of the light emission and improves the module maintenance convenience.

7 Claims, 4 Drawing Sheets

METHOD AND SYSTEM FOR LED CALIBRATION

FIELD OF THE INVENTION

The present invention generally relates to a method and system for LED calibration, and more specifically to a method and system with a controller and memory for calibrating serially connected LED modules.

BACKGROUND OF THE INVENTION

In recent years, LEDs are widely used to replace the conventional tungsten light bulbs in many lighting and signing applications because of the high luminance efficiency. However, as the current LED manufacturing process uses the semiconductor epitaxial process, the opto-characteristics of the LEDs vary greatly from batches to batches. Therefore, it is necessary to calibrate the manufactured LEDs. The current calibration method is to use a complex control circuit to obtain and store the optimal calibration data for each LED in the memory so as to calibrate the image signal in real-time and improve the lighting uniformity of the LEDs.

FIG. 1 shows a schematic view of a conventional LED calibration system. As shown in FIG. 1, a calibration host 20 outputs calibration control signal CCT, image enabling signal CCPG and image capturing control signal CCPT to LED module 10, image pattern generator 30 and image capturing device 40, respectively. According to CCT, LED module 10 enters either calibration mode or normal display mode. Image pattern generator 30, based on CCPG, generates image pattern signal PGS. Image capturing device 40, based on CCPT, performs image capturing on light LT emitted from LED module 10, and generates image capturing data IDT for calibration host 20. Calibration host 20 receives and processes IDT to generate calibration data for LED module 10, and LED module 10 stores the calibration data.

LED module 10 includes a controller 12, a driver 14, a memory 16 and a plurality of LED arrays 18, where each LED array 18 further includes a plurality of LEDs. When LED module 10 enters the calibration mode, controller 12 receives PGS to generate driver control signal DRVCTL for driver 14. After receiving DRVCTL, driver 14 generates drive signal DRV to drive the LEDs of LED array 18 to emit light LT of required brightness and color. At the same time, controller 12 receives CCT from image capturing device 40, and stores calibration data CCDT of CCT in memory 16 so that controller 12 can make all the LEDS generate uniform light by capturing CCDT in memory 16 to calibrate DRVCTL when LED module 10 enters the normal display mode.

The shortcomings of the conventional technology are the difficulty to install the above complex calibration device in the small-sized LED lighting device with the limited circuit board area and the increasing number of the LEDs, and the additional cost of the calibration device incurred to counteract the market competiveness.

Another shortcoming of the conventional technology is that the calibration data of all the LEDs are stored in a single memory of the module. If a few LED malfunction, it is necessary to perform calibration and obtain all the LEDs' calibration data of the new module after the replacement of the malfunctioned LEDs. However, for outdoor LED display, this approach increases the maintenance cost and sometimes even the entire LED module needs to be replaced.

Therefore, it is imperative to devise an easy-to-maintain and simply-structured LED module and a more efficient LED calibration method and system so improve the calibration of LED modules without increasing the manufacturing cost.

SUMMARY OF THE INVENTION

The primary object of the present invention is to provide a system for LED calibration, including serially connecting a plurality of LED modules, with each module having a plurality of LEDs, a driver and a controller. By transmitting the control signals output from calibration host to all the modules to light the LEDs of each module, the present invention also uses the controllers inside the modules to store the calibration data transmitted from the calibration host into the memory inside the driver so that the emitted light of the LEDs are calibrated to improve the lighting uniformity of the LEDs and keeping the module maintenance easy.

Another object of the present invention is to provide a system for LED calibration, where the drivers of the LED modules have built-in memory for storing LED calibration data and to simplify the circuit routing and circuit design of the LED modules.

Yet another object of the present invention is to provide a system for LED calibration, using the communication protocol established between the calibration host and the LED modules so that the LED modules are controlled by calibration host to enter either calibration mode or normal display mode.

Yet another object of the present invention is to provide a method for LED calibration, using the communication protocol established between the calibration host and the LED modules so that the LED modules are controlled by calibration host to enter either calibration mode or normal display mode, and the calibration host transmits control instructions and data in different modes so that the serially connected LED modules can obtain all the LED calibration data in a single calibration and store the LED calibration data of each LED module in the memory of the LED module.

Yet another object of the present invention is to provide a method for LED calibration, using the communication protocol established between the calibration host and the LED modules so that the controller of each LED module can capture the correct data from the data transmitted by the calibration host and stores the data in the memory for calibrating the LED opto-characteristics in normal display mode.

Therefore, through the system and method for LED calibration of the present invention, the aforementioned shortcomings of conventional LED calibration technology can be solved while reducing the hardware manufacturing cost and providing high efficiency maintenance.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
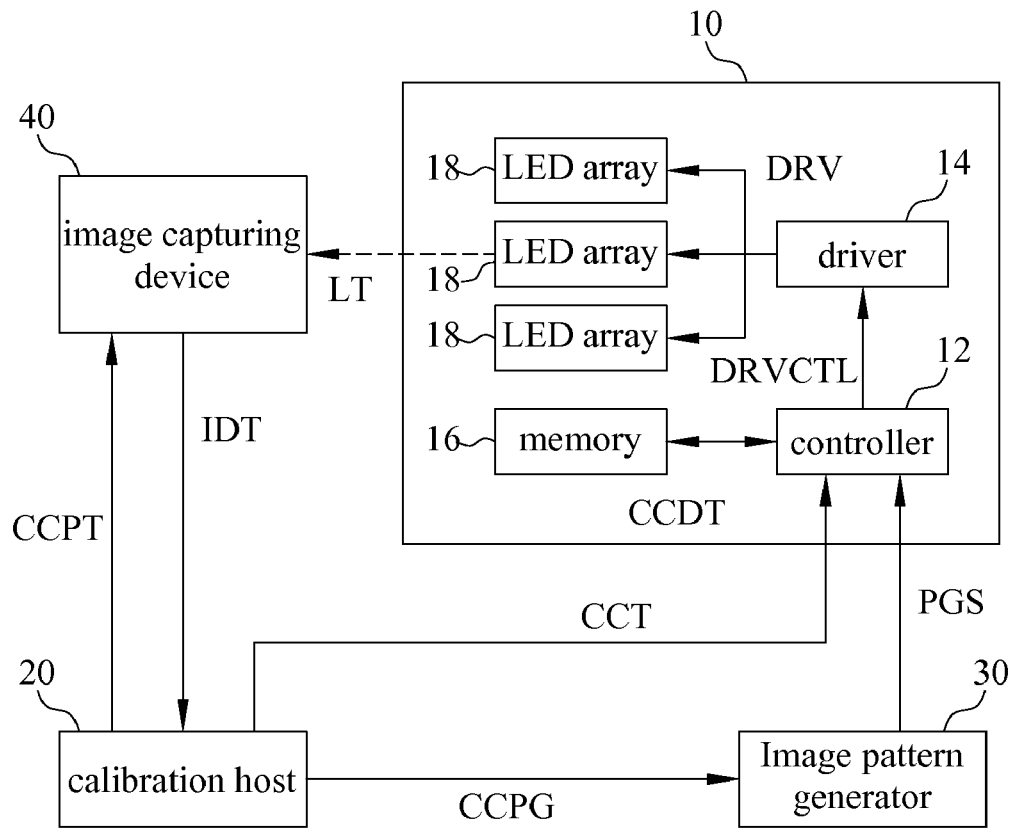
FIG. 1 shows a schematic view of a conventional LED calibration system.
Figure 2:
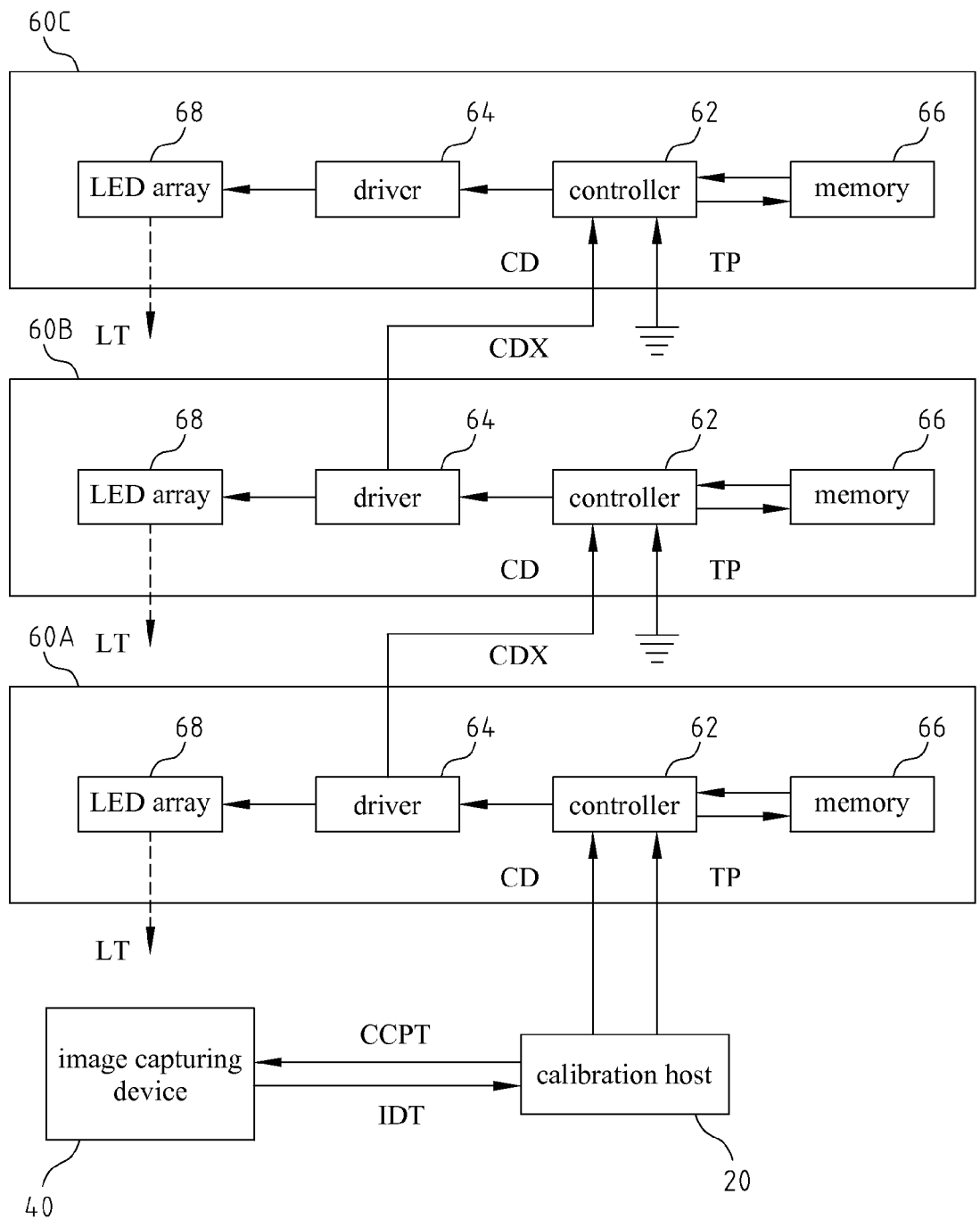
FIG. 2 shows a schematic view of a first embodiment of an LED calibration system of the present invention.

FIG. 2 shows a schematic view of the first embodiment of the LED calibration system of the present invention. The LED calibration system of the present invention includes a plurality of LED modules. The present embodiment includes three LED modules 60A, 60B, 60C, with each module including a controller 62, a plurality of drivers 64, a memory 66 and an LED array 68, where LED array 68 includes a plurality of LEDs (not shown). For simplicity, FIG. 2 shows only a driver 64. However, the driver of embodiment of the present invention includes the single-channel driver for driving a single LED and a multi-channel driver for driving a plurality of LEDs.

The LED calibration system of the present invention further includes a calibration host 20 and an image capturing device 40. Calibration host 20 controls the entire calibration process and outputs image capturing control signal CCPT to image capturing device 40 so that image capturing device 40 detects light LT emitted by LED modules 60A, 60B, 60C, and generates image capturing data (IDT). Calibration host 20 processes IDT to generate calibration data, which is sent through instruction data input signal CD to LED module for storage.

Driver 64 has an instruction data input end and an instruction data output end (not shown), and the plurality of drivers 64 in the LED modules are cascaded together by instruction data input end and instruction data output end. That is, the instruction data output end of the previous driver is connected to the instruction data input end of the next driver so that all the drivers can receive the data transmitted by calibration host 20.

Controller 62 of the LED module includes a signal input end of a self-test enabling TP and a signal input end of an instruction data input signal CD, where controller 62 will enter the self-test mode and send the default image signal automatically to the driver when self-test enabling TP is high so that the driver will light the LEDs and display the default image to provide self-test capability to the LED module. If self-test enabling TP is low, controller 62 will enter either calibration mode or normal display mode, based on instruction data input signal CD. In the present embodiment, self-test enabling TP is grounded for performing calibration.

The format of instruction data input signal CD includes an instruction byte and a plurality of data bytes. The instruction byte is configured as calibration mode and normal display mode, such as, h00 in instruction byte indicating the calibration mode and h01 in instruction byte indicating the normal display mode. Of course, the configuration of the instruction byte is not limited to the above exemplary. In addition, the number of the data bytes can be optimized according to the system requirement. For example, for the LED module with N single-channel drivers, N data bytes can be allocated. For the LED module with N dual-channel drivers, 2N data bytes can be allocated for lighting LEDs or for transmitting LED calibration data.

In calibration mode, controller 62 first transmits the data bytes of instruction data input signal CD directly to the instruction data input end of driver 64 of LED module 60A. The instruction data output end of driver 64 is connected to the instruction data input end of the next driver 64, and so on, for lighting all LEDs of LED module 60A. At the same time, the instruction data output end of the last driver 64 of LED module 60A is instruction data output signal CDX of LED module 60A, as shown in FIG. 2, and is connected to instruction data input signal CD of next LED module 60B, and so on.

Because the data in the data bytes are the calibration image of calibration host 20, calibration host 20 then receives image capturing data IDT from image capturing device 40, and generates the data bytes to indicate the LED calibration data. Therefore, controller 62 will store the data into memory 66 to complete the calibration process.

When in normal display mode, controller 62 will use the externally input data bytes with the calibration data captured from the memory to perform calibration computation to generate the calibration driving control signal for driver 64 so that driver 64 can light the LEDs and display the uniform light LT. The calibration computation can be addition or multiplication, depending on the manner in which calibration host 20 uses to obtain the calibration data when in calibration mode.

It is worth noting that the CD format of the present embodiment and the calibration computation are only exemplary, and the scope of the present invention is not limited to the above embodiment. In other words, any CD format able to transmit mode selection information and image data information are all within the scope of the present invention. Also, any calibration computation able to match the manner with which calibration host 20 uses to generate calibration data is also within the scope of the present invention.

Figure 3:
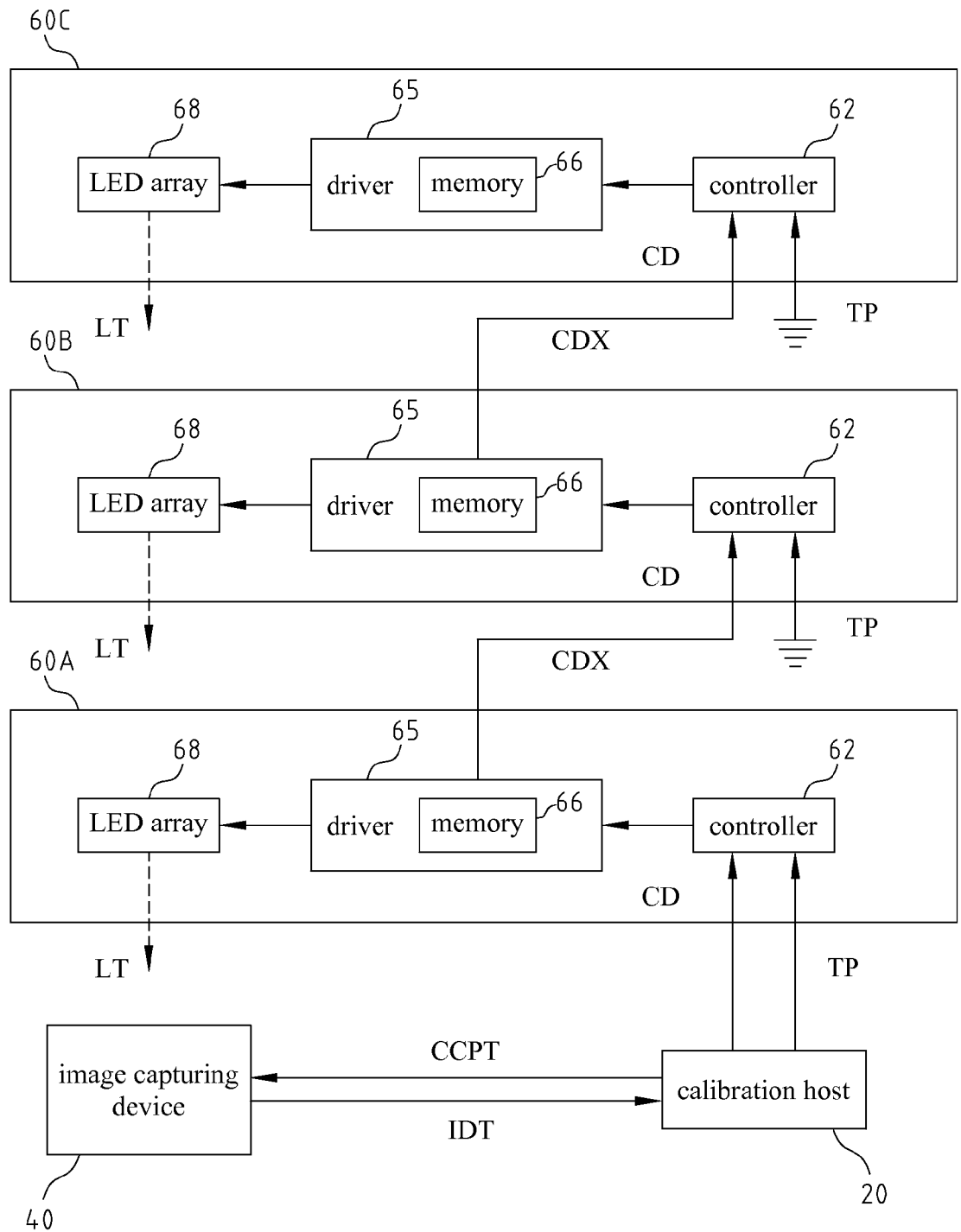
FIG. 3 shows a schematic view of a second embodiment of an LED calibration system of the present invention.

FIG. 3 shows a schematic view of a second embodiment of an LED calibration system of the present invention. In this embodiment, driver 65 of the LED calibration system includes a built-in memory 66 so as to simplify the circuit design and layout of LED module 60. In addition, memory 66 can also be included inside controller 62 to achieve the same simplification of the circuit design and layout of LED module 60. Memory 66 of the first and second embodiments can be EEPROM.

Figure 4:
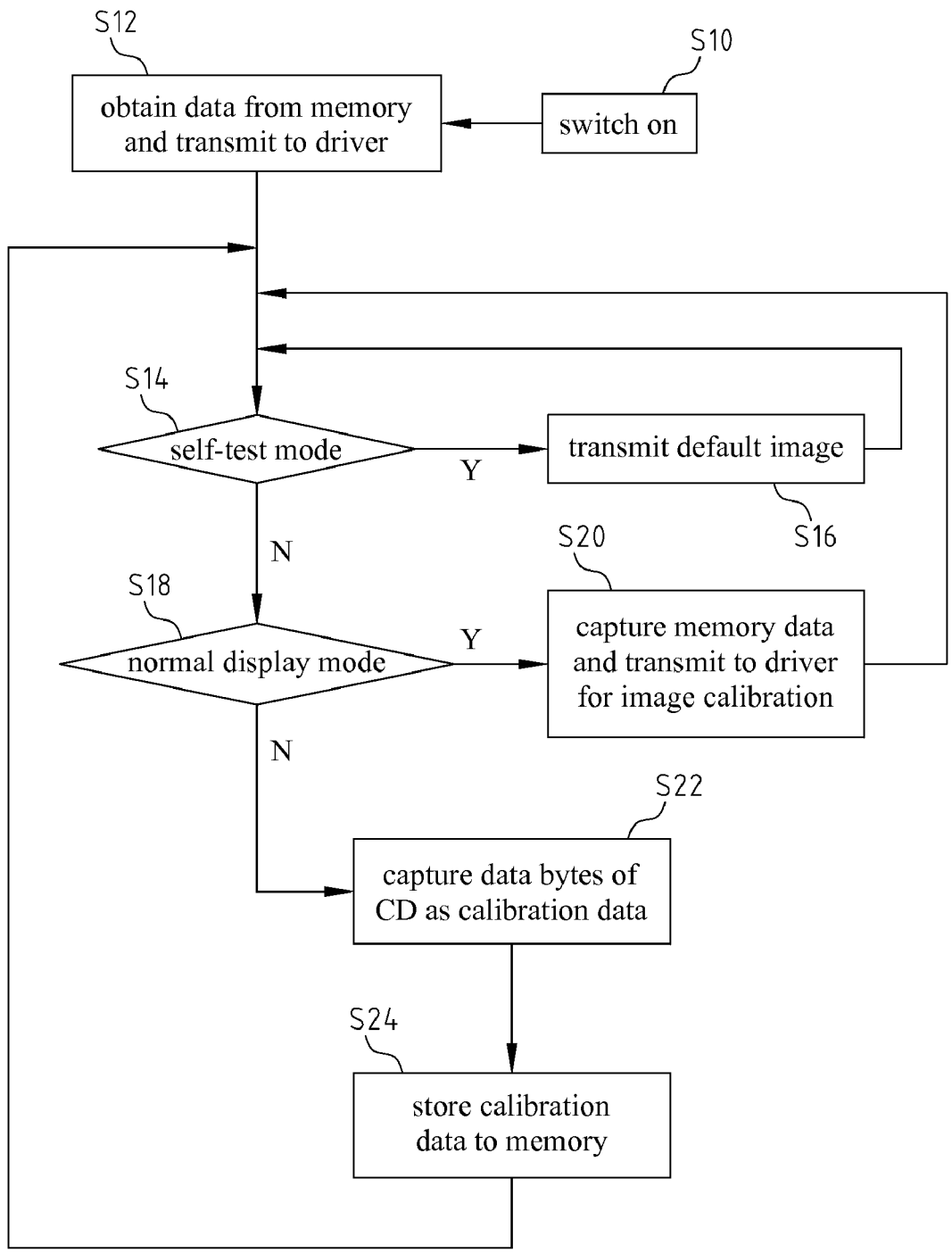
FIG. 4 shows a flowchart of an LED calibration method of the present invention.

FIG. 4 shows an LED calibration method of the present invention, controlled by controller 62. After the host is switched on in step S10, step S12 is for the memory to obtain the data and transmit to the driver. Step S14 is to determine whether it is in self-test mode. When self-test enabling TP of controller 62 is high, LED module enters the self-test mode and then proceeds to step S16 to transmit the default image data to the driver so that LEDs display the default image and returns to step S14. If self-test enabling TP is low in step S14, proceed to step S18. Step S18 is to use the instruction byte of CD instruction data input signal to determine whether the mode is the normal display mode. If in normal display mode, proceed to step S20 to capture memory data and transmit to the driver for image calibration to make LEDs display the calibrated image; otherwise, proceed to step S22 to capture the data bytes of CD as calibration data and proceed to step S24. Step S24 is to store the calibration data to the memory and return to step S14 and repeat the above operations.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An LED calibration system, comprising:
    a calibration host, for generating an image capturing control signal and using a calibration computation to generate an instruction data input signal;
    an image capturing device, for receiving said image capturing control signal to perform image capturing and to generate an image capturing data; and
    a plurality of LED modules, each said LED module having a self-test enabling signal, an instruction data input signal and an instruction data output signal, said instruction data input signal of a said LED module being connected to said instruction data input signal of said calibration host, and said LED modules being connected in cascaded manner, said instruction data output signal of a previous said LED module being connected to said instruction data input signal of a next said LED module, said LED module further comprising:
- a controller, for receiving said self-test enabling signal and said instruction data input signal to perform an appropriate processing to generate a driver control signal or a memory access signal;
- a plurality of drivers, each said driver having an instruction data input end and an instruction data output end, and generating a driving signal, said instruction data input end of a said driver being connected to said driver control signal of said controller, and said drivers being connected in cascaded manner, said instruction data output end of a previous said driver being connected to said instruction data input end of a next said driver, said instruction data output end of a last said driver being connected to said instruction data output signal of said LED module;
- a memory, connected to said memory access signal of said controller, for providing said controller to access data; and
- an LED array, comprising a plurality of LEDs, each said LED receiving said driving signal from said corresponding driver to emit light;

wherein said instruction data input signal of said calibration host comprising an instruction byte and a plurality of data bytes, based on said self-test enabling signal, said controller determining whether to enter a self-test mode, and said controller further determining whether to enter a calibration mode or a normal display mode in accordance with said instruction byte.

2. The LED calibration system as claimed in claim 1, wherein said self-test enabling signals of said controllers are grounded so that said LED modules enter said self-test mode.

3. The LED calibration system as claimed in claim 1, wherein said appropriate process of said controller comprises:
- when in said self-test mode, automatically sending a default image to said drivers so that said drivers light all said LEDs to display said default image;
- when in said calibration mode, extracting an image data from received said instruction data input signal, generating said driving signal to drive said LEDs, and then image capturing data of said image capturing device being received by said calibration host, said image capturing data being LED calibration data, through said instruction data input signal, said calibration data being transmitted to said controllers of said LED modules, said controllers extracting said calibration data and storing to said memory; and
- when in said normal display mode, extracting an image data from received said instruction data input signal, capturing said calibration data from said memory, using an appropriate computation on said image data and said calibration data to generate a calibration image driving signal as said driver control signal, and transmitting said driver control signal to said drivers for driving said LEDs.

4. The LED calibration system as claimed in claim 3, wherein said appropriate computation of said controller is a computation matching said calibration computation of said calibration host.

5. An LED calibration method, for using a calibration host to control an image capturing device and a plurality of cascaded LED modules, each said LED module comprising a controller, a plurality of drivers, a memory and an LED array, said LED array having a plurality of LEDs, for obtaining and storing calibration data of said LEDs to said memory, said method comprising the steps of:
- Step A: switch on, enter step B;
- Step B: said controller obtains original data from said memory and transmits to said driver, and enter step C;
- Step C: said controller determines whether entering self-test mode, when a self-test enabling of said controller is high, said controller enters self-test mode, and enter step D; if said self-test enabling is low, then enter step E;
- Step D: said controller transmits a default image data to said drivers for said LEDs to display said default image, and returns to step C;
- Step E: said controller uses an instruction byte of an instruction data input signal to determine whether entering normal display mode, if to enter normal display mode, then enter step F, otherwise, enter step G for calibration mode;
- Step F: capture memory data and transmit to said drivers for performing image calibration to make said LEDs display calibration image and return to step C;
- Step G: capture a plurality of data bytes of said instruction data input signal as calibration data of said LEDs and enter step H: and
- Step H: store said calibration data into said memory and return to step C to repeat the above steps.

6. The LED calibration method as claimed in claim 5, wherein said calibration host generates an image capturing control signal and use a calibration computation to generate an instruction data input signal; said image capturing device receives said image capturing control signal to perform image capturing and to generate an image capturing data; each said LED module of said plurality of LED modules has a self-test enabling signal, an instruction data input signal and an instruction data output signal, said instruction data input signal of a said LED module are connected to said instruction data input signal of said calibration host, and said LED modules are connected in cascaded manner, said instruction data output signal of a previous said LED module are connected to said instruction data input signal of a next said LED module, said controller of said LED module receives said self-test enabling signal and said instruction data input signal and performs said steps A-H to generate a driver control signal or a memory access signal transmitted to said drivers and said memory, respectively; said controller has an instruction data input end and an instruction data output end, and generates a driving signal; said instruction data input end of a said driver is connected to said driver control signal of said controller, and said drivers being connected in cascaded manner, said instruction data output end of a previous said driver being connected to said instruction data input end of a next said driver, said instruction data output end of a last said driver being connected to said instruction data output signal of said LED module; said memory of said LED module is connected to said memory access signal of said controller, for providing said controller to access data; and said LEDs receive said driving signal from said corresponding driver to emit light.

7. The LED calibration method as claimed in claim 6, wherein said calibration computation of said calibration host is a computation matching said appropriate computation of said controller.

* * * * *